J. H. BROWN.
PROCESS OF MAKING PNEUMATIC TIRES.
APPLICATION FILED JUNE 19, 1912.
1,121,467.
Patented Dec. 15, 1914.
2 SHEETS—SHEET 1.
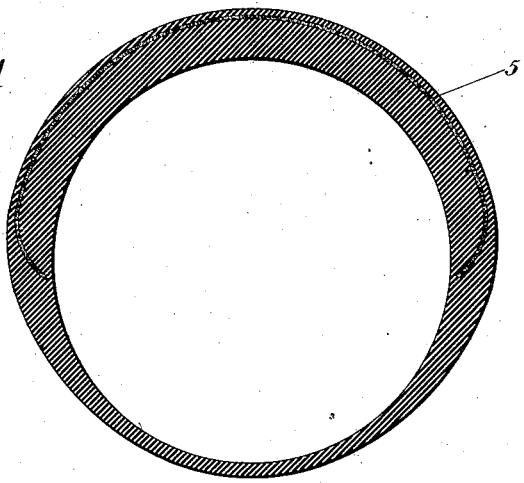
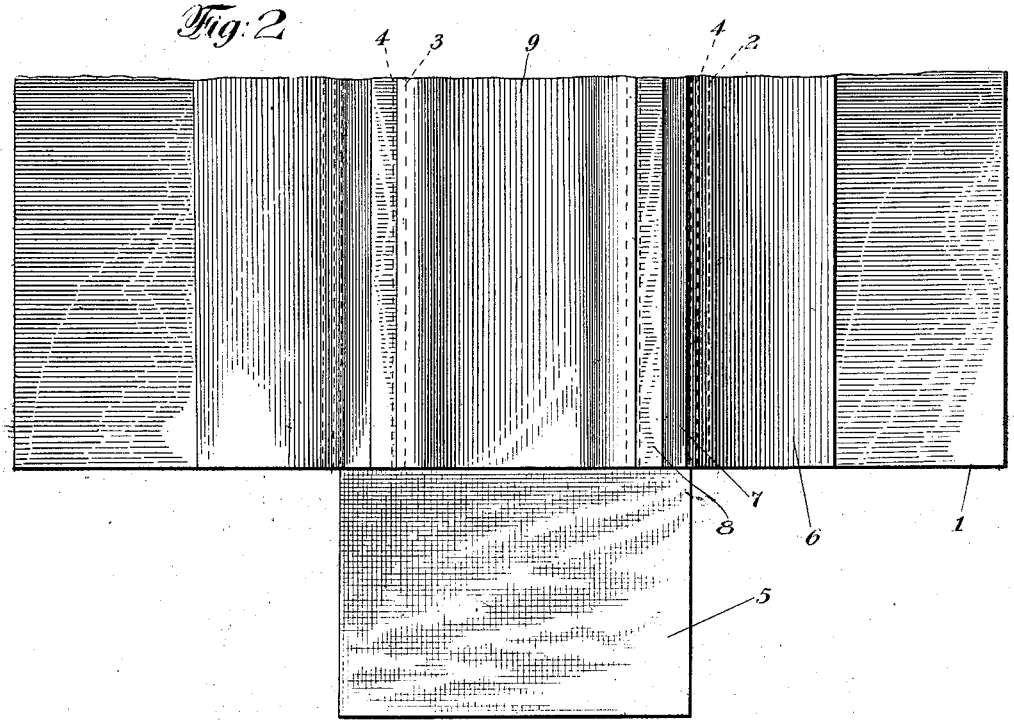
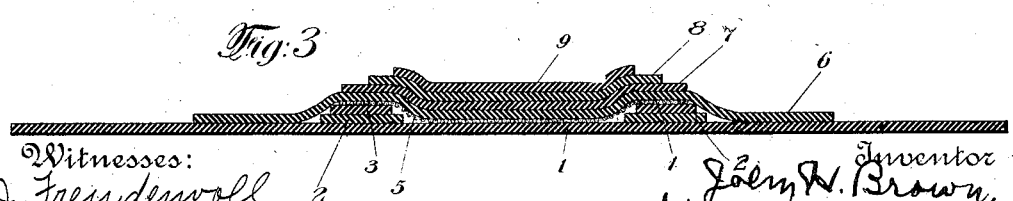

J. H. BROWN.
PROCESS OF MAKING PNEUMATIC TIRES.
APPLICATION FILED JUNE 19, 1912.
1,121,467.
Patented Dec. 15, 1914.
2 SHEETS—SHEET 2.
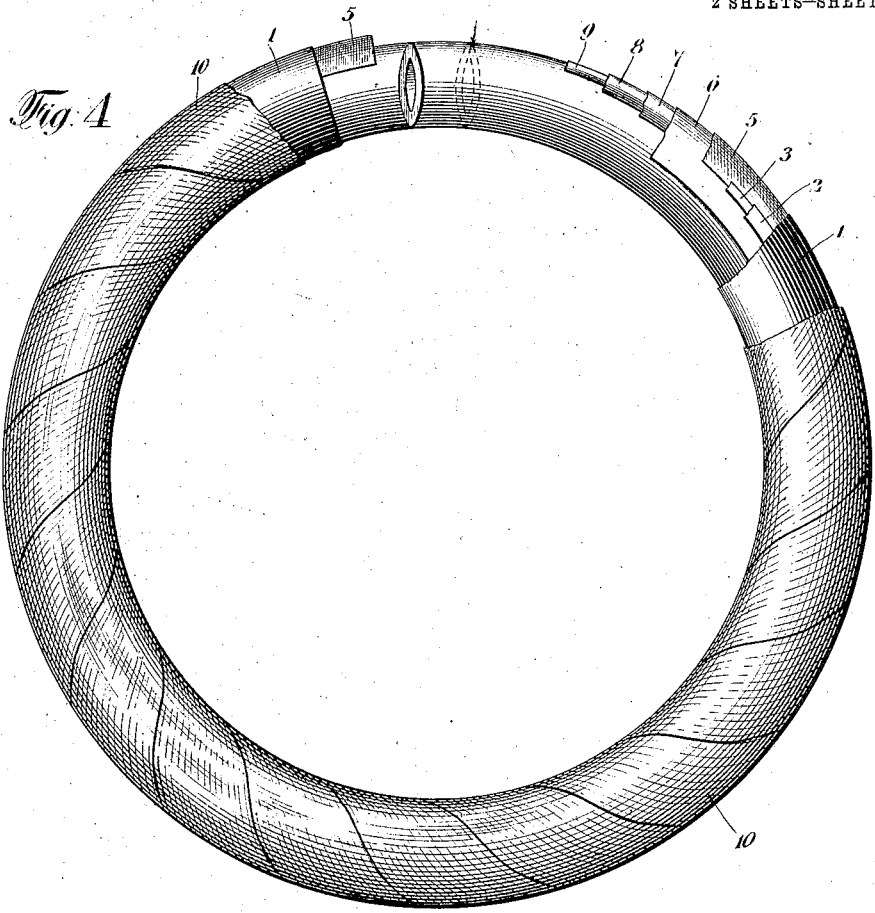
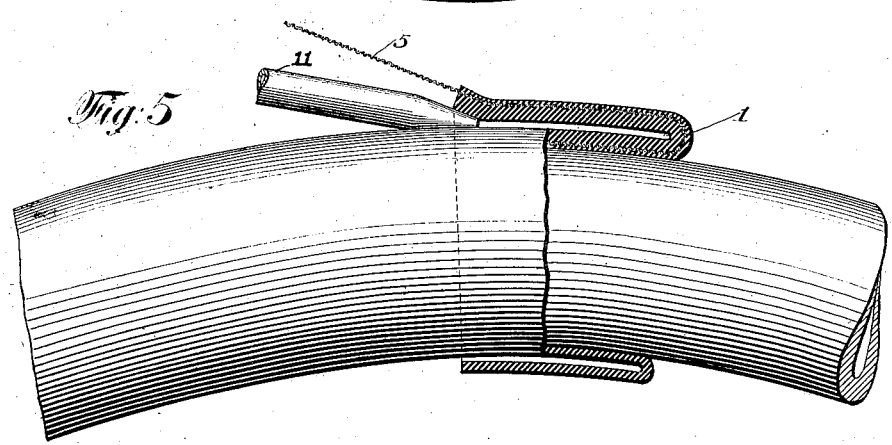

UNITED STATES PATENT OFFICE.

JOHN H. BROWN, OF NEW YORK, N. Y., ASSIGNOR TO BROWN PERFECTION TUBE COMPANY, OF NEW YORK, N. Y., A CORPORATION OF NEW YORK.

PROCESS OF MAKING PNEUMATIC TIRES.

1,121,467.  Specification of Letters Patent.  Patented Dec. 15, 1914.

Application filed June 19, 1912. Serial No. 704,638.

*To all whom it may concern:*

Be it known that I, JOHN H. BROWN, of New York city, in the county of New York, and in the State of New York, have invented a certain new and useful Improvement in Processes of Making Pneumatic Tires, and do hereby declare that the following is a full, clear, and exact description thereof.

The object of my invention has been to devise a process of making pneumatic tires of the type in which the material of the tread is under compression so that, when said tread is punctured, the material thereof will expand and close the said puncture, which process shall be convenient and reliable in operation, and shall be capable of producing tires which shall efficiently perform the said self-sealing function, and to such ends my invention consists in the process of making pnuematic tires hereinafter specified.

In the accompanying drawings Figure 1 is a transverse sectional view of a tire made by my process; Fig. 2 is a plan view of the blank from which the said tire is made: Fig. 3 is an end view of Fig. 2; Fig. 4 is a side elevation of a mandrel adapted for use in practising my process, the blank being shown in place upon the mandrel ready to be vulcanized; and Fig. 5 is a view, partly in section, illustrating the step of stripping my blank off the mandrel.

While I have illustrated the best embodiment of my invention, known to me, such embodiment is to be regarded as typical only of many possible embodiments of the invention, and my invention is not to be limited to the particular embodiment shown.

The tire, which it is the object of my process to make, is the subject of a separate application for patent executed June 19th, 1912, Serial No. 704,637, and I shall not, therefore, in this application describe such tire in detail. In forming the blank from which the said tire is to be made, I preferably follow the following procedure: I provide a strip of unvulcanized rubber 1 of a width slightly greater than the outer periphery which my tire is to have, transversely considered, and of a length sufficient to make the full length of the tire and allow for splicing. Near the outer edges of the said strip I then lay narrower strips 2, which extend approximately to the margin of the tread proper. Upon each of the strips 2 I lay narrower strips 3 and 4, which also extend approximately to the edge of the tread proper. I then lay on the said strips, over the tread portion of the tire, a strip of retaining fabric 5, preferably Sea Island canvas. The said fabric is preferably coated upon both sides with rubber, and is of such a nature that it can stretch longitudinally several inches, if necessary, without breaking. Upon the said fabric I then place several layers of rubber, 6, 7, 8 and 9, in the present instance four, which are progressively narrower. The strip of fabric 5 is preferably caused to extend sufficiently beyond the strips of rubber to afford a handhold in stripping the completed tire off the mandrel. The rubber which I find gives the best results is good "live" rubber. The blank having been prepared as described is then laid upon the mandrel with the strip 9 on the outer periphery of the mandrel, and the blank is folded around the mandrel until its edges overlap on the inner periphery of the mandrel. The blank is then held in place by wrapping a strip of cloth 10 spirally about the blank and mandrel. The two ends of the strip 9 are preferably prevented from meeting at the splice so as to avoid forming an air channel through its fibers from the inner to the outer periphery of the tire. The mandrel and tire blank are then placed in a vulcanizing chamber and the tire is vulcanized. Upon removing from the vulcanizing chamber, the spirally wrapped strip of cloth 10 is unwound, and the operator then takes hold of the free end of the compression band strip 5 and begins to strip the tire off the mandrel by turning it inside out like a stocking. In order to prevent the tire from sticking upon itself as this turning operation is performed, I preferably introduce a tube 11, from a source of compressed air, between the inner and outer portions of the tire and the compressed air forms, so to speak, a lubricant that sufficiently prevents the two from sticking together to enable the tire to be stripped off. The tire is then ready for splicing together by tapering and telescoping the ends, and is then complete.

In Fig. 2 I have shown a cross section of my completed tire.

It will be observed that my process has, among others, the following advantages: My tire, as made by my process, has its inner periphery approximately not longer than the portion of the rim of the wheel against which it is to lie, while the tread is of approximately the full periphery desired in the tire. This results in avoiding any wrinkling or buckling in the inner periphery of the tire, as would be the case if the tire were made on a straight mandrel. As the fabric in my tire is caused to adhere to the mandrel by the rubber between its bare threads and the mandrel, the fabric is securely retained in position during the placing of the blank upon the mandrel and the subsequent operations, and may be depended upon to occupy the desired position in the completed tire.

The tread of my tire can be made as thick as desired by my process, so that any desired amount of compression can be obtained. The edges of the compression band 5 of my tire pass diagonally through the thickened tread from near the outer portion to near the inner portion thereof, when the tire is made by my process, which affords very great advantages in the tire itself, as explained in the said companion application, and yet said fabric does not extend continuously from inside to outside of the tire so as to afford a passage for the escape of air.

By making the said tire by my process the rubber of the tread is put under abundant compression so that when a puncture occurs the rubber has ample elasticity to fill up the puncture and prevent the escape of air.

I claim:

1. The process of making pneumatic tires, consisting in building up a blank having a thickened tread portion, and having a retaining fabric strip on or near the normal outside of said tread portion, vulcanizing said blank on an annular rigid mandrel with said fabric nearer said mandrel than said tread portion, and turning said tire inside out like a stocking.

2. The process of making pneumatic tires, which consists in forming a flat blank in the form of a strip, said blank having a thickened central portion, laying a strip of fabric over said thickened portion, placing said blank on an annular rigid mandrel with said strip of fabric nearer to said mandrel than said thickened portion, vulcanizing said tire on said mandrel, and removing it from said mandrel by turning said tire inside out like a stocking.

3. The process of making pneumatic tires, comprising forming a blank by building it up out of sheet rubber, a strip of such rubber of the full cross-section periphery of the finished tire being first provided, elevations or thickened portions being formed on said strip approximately at the edges of the tread portion of the tire, a strip of fabric being then laid between said elevations and upon said first mentioned strip of rubber, a thickened tread portion then being built up of rubber over said strip of fabric, said blank then being placed upon an annular rigid mandrel with said first mentioned strip of rubber against the outer peripheral surface of said mandrel, said tire being vulcanized on said mandrel and then turned inside out like a stocking.

4. The process of making pneumatic tires consisting in forming a blank having ridges near the edges of the tread portion, placing a strip of fabric with its edges on said ridges and its body lying therebetween, forming a thickened rubber portion over said strip of fabric, forming a tube of said blank with said fabric on the inner portion thereof, vulcanizing said tube and turning it inside out like a stocking.

5. The process of making pneumatic tires, consisting in forming a blank with a thickened tread portion, placing a strip of fabric over said tread portion, said strip of fabric extending beyond the end of said blank, placing said blank on an annular rigid mandrel with said strip of fabric nearer to said mandrel than said tread portion, vulcanizing said blank on said mandrel, and turning said blank inside out on said mandrel like a stocking, using said extended portion of said strip for a handhold in so doing.

6. The process of making tires, consisting in forming a blank with a thickened tread portion, placing a strip of fabric over said tread portion, placing said blank on an annular rigid mandrel with said fabric nearer said mandrel than said tread portion, vulcanizing said tire and stripping it off said mandrel by turning it inside out like a stocking, and at the same time injecting a fluid beneath the turned-over portion of the tire to facilitate said stripping operation.

7. The process of making pneumatic tires, comprising forming a blank with a thickened tread portion, placing a strip of fabric on the outer periphery of an annular rigid mandrel, interposing rubber between said fabric and said mandrel to prevent misplacement of said fabric, securing said blank upon said mandrel with its thickened tread portion over said fabric, vulcanizing said blank and fabric together, and the edges of said blank to each other while on said mandrel, and turning the tire thus formed inside out like a stocking.

8. The process of making pneumatic tires, comprising forming a blank having a thickened tread portion, embedding a strip of fabric in said tread portion, the body of said strip being near the normal outer periphery of the tread, and the edges of said strip being extended diagonally through said tread to near its inner periphery, placing said blank on an annular rigid mandrel with the normal outer periphery of the tread nearest the mandrel, vulcanizing said tire and turning it inside out.

9. The process of making an inner tube for pneumatic tires, comprising assembling a rubber blank and a strip of fabric upon a rigid, annular mandrel substantially of the shape of the interior of the tube when in normal use, the blank having a thickened tread portion, said tread portion and said fabric being placed upon the outer periphery of the mandrel but with the fabric nearer to the mandrel than the tread portion, causing said blank to completely surround the mandrel, vulcanizing said parts, and turning said tube inside out like a stocking.

In testimony that I claim the foregoing I have hereunto set my hand.

JOHN H. BROWN.

Witnesses:
 EDWIN J. PRINDLE,
 SAMUEL SCHWARTZMAN.